United States Patent [19]
Allison

[11] 3,724,869
[45] Apr. 3, 1973

[54] TORSION SPRING ATTACHMENT CONSTRUCTION

[75] Inventor: William D. Allison, Grosse Pointe Farms, Mich.

[73] Assignee: Ford Motor Company, Dearborn, Mich.

[22] Filed: Dec. 21, 1970

[21] Appl. No.: 99,861

[52] U.S. Cl. ............... 280/124 B, 267/11, 267/57
[51] Int. Cl. ............................................. B60g 21/04
[58] Field of Search ........ 280/124, 124 B; 267/11, 57

[56] References Cited
UNITED STATES PATENTS

| | | |
|---|---|---|
| 2,631,844 | 3/1953 | Paton .......................... 280/124 B |
| 2,542,363 | 2/1951 | Sarnac ............................. 267/57 |
| 2,860,870 | 11/1958 | McIntyre ..................... 267/57 X |

Primary Examiner—Albert J. Makay
Attorney—John R. Faulkner and Clifford L. Sadler

[57] ABSTRACT

A torsion bar attachment construction in which a torsion bar has a hook-shaped end that passes through an aperture in a suspension arm and engages a recessed spring seat formed in the arm. The torsion bar is stressed to maintain it in engagement with the suspension arm.

7 Claims, 6 Drawing Figures

INVENTOR
WILLIAM D. ALLISON
BY John R. Paulkner
Clifford L. Sadler
ATTORNEYS

PATENTED APR 3 1973 3,724,869

INVENTOR
WILLIAM D. ALLISON
BY John R. Faulkner
Clifford L. Sadler
ATTORNEYS

TORSION SPRING ATTACHMENT CONSTRUCTION

BACKGROUND OF THE INVENTION

The present invention relates to a means for attaching a torsion bar spring to a suspension arm and is useful in a suspension system of the type disclosed in my copending application Ser. No. 100,114 filed Dec. 21, 1970 and entitled Independent Suspension System for a Motor Vehicle. The disclosure of that application is incorporated herein by reference.

This invention is particularly concerned with means for attaching a torsion bar to a suspension arm in a suspension system where the bar serves the triple functions of supporting the chassis on the arm, controlling body roll and positioning the arm longitudinally with respect to the vehicle frame.

BRIEF SUMMARY OF THE DISCLOSURE

In accordance with the presently preferred embodiment of this invention, a vehicle suspension system has a plurality of torsion bar springs that interconnect the left and right laterally extending suspension arms of an independent front suspension system. The bars serve as main suspension springs, drag struts and roll stabilizers. A secure attachment between each bar and the suspension arm is required to prevent pull-out or separation on wheel impact and on brake application. To function as torsion springs, the bars must transmit forces to the arms in a direction to load the wheel.

In the preferred construction, each suspension arm is formed as a channel-shaped sheet metal member with a plurality of apertures in its central web. A recessed spring seat is formed in the web adjacent to each aperture. Each one of a plurality of torsion bars in provided with a hook-shaped end which fits through an aperture and has its tip seated in the recessed spring seat. The bars are prestressed to resiliently support the vehicle chassis on the suspension arm. The bar ends fit snugly in the apertures in the suspension arm and serve as drag struts by engaging the edges of the apertures and preventing longitudinal displacement of the arm.

BRIEF DESCRIPTION OF THE DRAWINGS

The many objects and advantages of the present invention will become apparent upon consideration of the following detailed discussion and the accompanying drawings, in which.

DETAILED DESCRIPTION OF A PREFERRED EMBODIMENT

Figure 1:
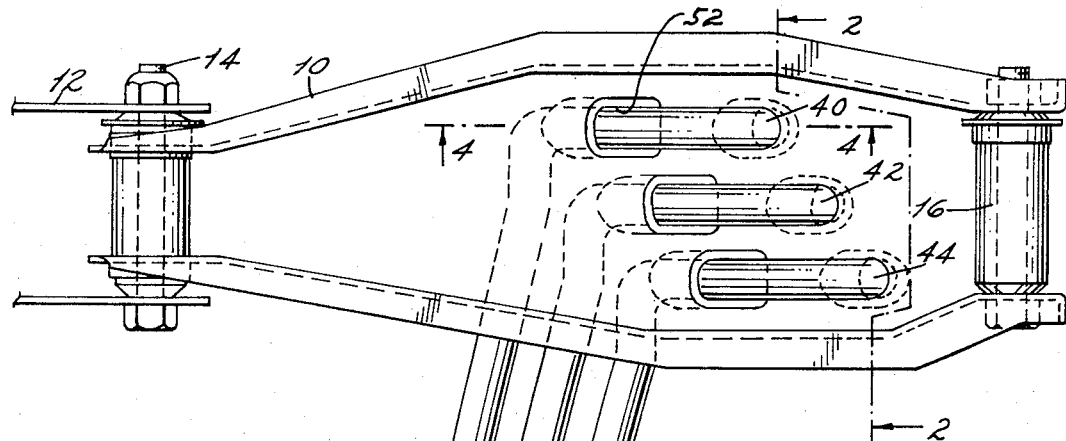
FIG. 1 is a top plan view of an independent suspension system for a motor vehicle incorporating the presently preferred embodiment of this invention.
Figure 3:
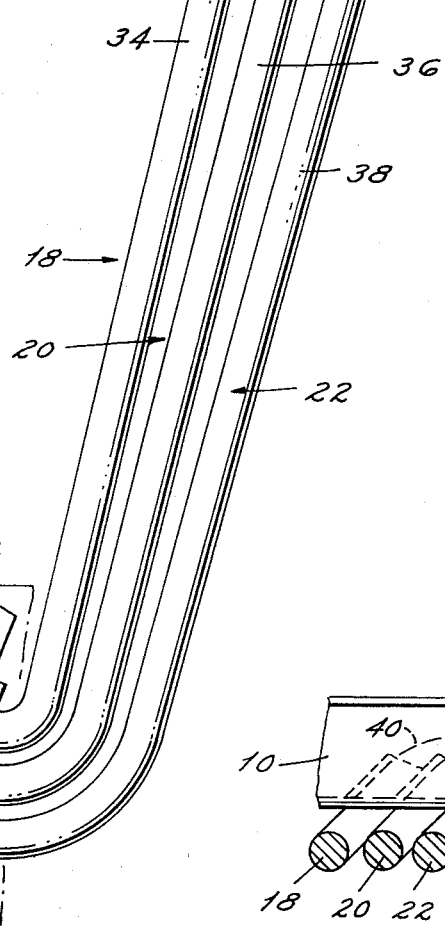
FIG. 3 is a front elevational view showing the torsion bar to suspension arm connection.

Referring to the drawings, wherein the presently preferred embodiment of this invention is shown, FIG. 1 discloses a portion of an independent suspension system for the dirigible wheels of a motor vehicle. The suspension system may be of the general type disclosed in my copending application Ser. No. 100,114 entitled Independent Suspension System for a Motor Vehicle and filed Dec. 21, 1970.

In the suspension system of FIG. 1, a lower suspension arm 10 is pivotally connected to a chassis frame component 12 by means of a pivot bushing construction 14. The outer end of the suspension arm 10 is provided with a pivot bushing 16 to which a wheel support member may be connected. The pivot bushing 16 may be used to connect the suspension arm 10 to a telescopic pillar that would carry a king pin support member or it may be used for connection directly to a king pin support member.

Suspension arm 10 in FIG. 1 is situated at the right side of the vehicle chassis. A similarly constructed suspension arm 10 is also provided for the right-hand side of the vehicle. In accordance with the invention, a plurality of torsion bars 18, 20 and 22 interconnect the left and right suspension arms 10. The bars 18, 20 and 22 have transversely extending midportions 24, 26 and 28. The left and right ends of the transverse portions 24, 26 and 28 are supported on a chassis frame member 30 by means of left and right resilient bushings 32.

The torsion bars 18, 20 and 22 have longitudinally extending portions 34, 36 and 38, respectively. The bar portions 34, 36 and 38 constitute drag struts and interconnect the transverse bar portions 24, 26 and 28 with the suspension arms 10.

Means are provided in accordance with the preferred embodiment of the invention for attaching the ends of the torsion bars 18, 20 and 22 to the suspension arms. For this purpose, bars 18, 20 and 22 are provided with hook-shaped ends 40, 42 and 44. The hook-shaped ends 40, 42 and 44 extend laterally in the plan view in alignment with the suspension arm 10.

Figure 2:
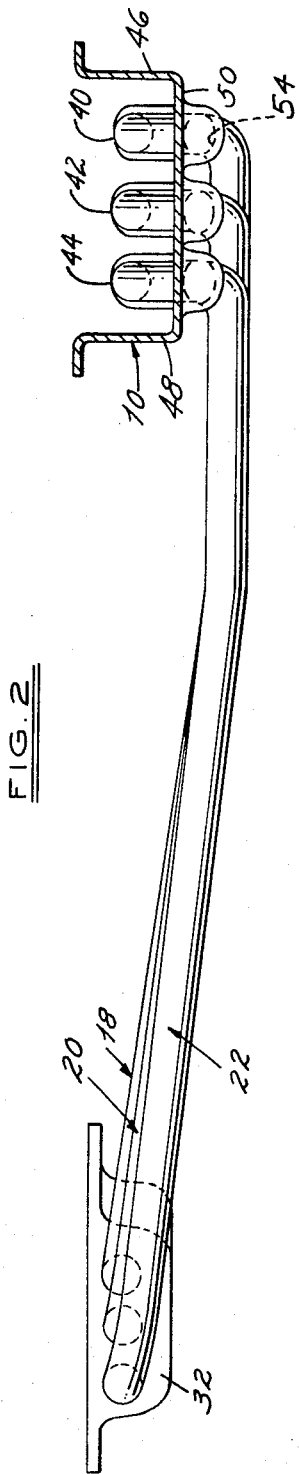
FIG. 2 is a side elevational view of the suspension of FIG. 1 with a portion of the suspension arm shown as a sectional view taken along section line 2—2 of that figure.

As seen in FIG. 2, the left suspension arm 10 is formed as a stamping having a generally channel-shaped cross section. The arm 10 is provided with vertical flanges 46 and 48 that are interconnected by a horizontal web 50. The web 50 has an aperture 52 through which the hook-shaped end 40 of the bar 18 extends. Spaced from the aperture 52 is a recessed spring seat 54. The seat 54 complements the configuration of the tip 56 of the hook portion 40 and the tip 56 rests in the spring seat or pocket 54. The aperture 52 is substantially equal in size to the diameter of the hook end 40. The spring seat 54 is formed as a groove having a width substantially equal to that of the tip portion 56 of rod 18.

Figure 4:
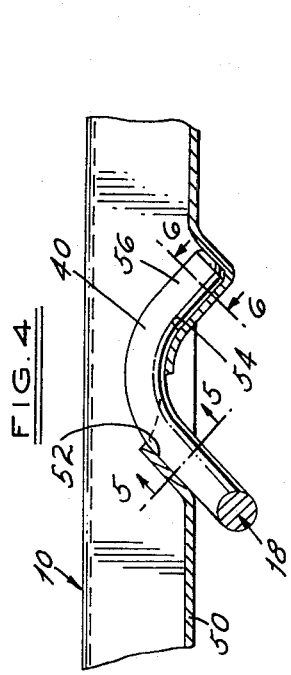
FIG. 4 is a sectional view taken along section line 4—4 of FIG. 1.
Figure 6:
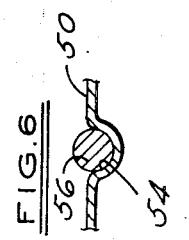
FIG. 6 is a sectional view taken along section line 6—6 of FIG. 4.
Figure 5:
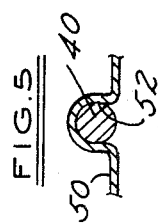
FIG. 5 is a sectional view taken along section line 5—5 of FIG. 4.

FIGS. 4, 5 and 6 disclose the connection of the end of the rod 18 to the arm 10. The ends of rods 20 and 22 are similarly connected to arm 10.

The several figures of the drawings disclose the suspension construction at the left side of the vehicle suspension. The arrangement at the right side is similar.

OPERATION

The operation of the suspension system of FIGS. 1 and 2 is similar to that described in my aforementioned copending application Ser. No. 100,114. Each of the bars 18, 20 and 22 serves a triple function. They are prestressed prior to installation in the vehicle and thereby provide a resilient force supporting the vehicle chassis upon the suspension arms 10. The bars 18, 20 and 22 also provide resilient resistance to angular deflection of the vehicle body about its longitudinal roll axis. The longitudinally extending bar portions 34, 36 and 38 function as drag struts to control the longitudinal position of the suspension arms 10.

The present invention provides a unique suspension system with a novel means for attaching the torsion bars to the suspension arms. A secure attachment between each bar and the suspension arm is required to prevent pull out or separation on wheel impact or upon brake application. To function as torsion springs, the bars must transmit forces to the arm in a direction to load the wheels.

Torsion bars in accordance with this invention are provided with hooks 40, 42 and 44 that fit through openings 52 in the arms 10 and into spring seats such as recess 54 formed in the arms. The hooked ends 40, 42 and 44 are secured in position by the torsional twist of the bars 18, 20 and 22. Each bar end applies opposed forces to the suspension arm at spaced points, that is, to the arm sheet metal at the periphery of the aperture and at the bar tip nested in the recessed spring seat formed in the arm web. Fore and aft location of the suspension arm is located by the sides of the apertures in the arms which engage the hooked portions of the bars.

A typical wheel travel for a front suspension in accordance with this invention would be about 4 inches of upward movement and about five inches downward from design load position. Modern spring rates would provide about 10 or 11 inches of equivalent wheel deflection to reach the design load position. Therefore, within the working range of wheel travel (four inches up plus five inches down), the torsion bars and arms are securely attached to each other by the interconnection between the bars and arms and the spring load of the bars.

The arms may be assembled to the torsion bars as a subassembly and then installed in the vehicle chassis by securing the inner arm pivots and the bar support frame pivots. The outer ends of the arms may then be raised to the wheel travel operating range and attached to the wheel support member.

Major features of a suspension system constructed in accordance with this invention are optimum use of space, reduced cost and weight, and simplified vehicle structure and assembly.

As used in the following claims, the term "frame" refers to vehicle support structure generally whether integral with the body sheet metal or separate.

The foregoing description presents the presently preferred embodiments of this invention. Modifications and alterations may occur to those skilled in the art that will come within the spirit and scope of the following claims.

I claim:

1. A torsion bar, a member and attachment means securing said bar to said member,
said attachment means comprising an aperture formed in said member,
a spring seat formed in said member adjacent said aperture,
said bar having an elongated portion and a hook-shaped end portion connected to said elongated portion,
said hook-shaped end portion lying in a plane that intersects the axis of said elongated portion at an acute angle,
said hook-shaped end passing through said aperture and having the tip of said end seated in the adjacent spring seat,
said bar being stressed whereby said tip is biased into engagement with said spring seat.

2. A suspension system for a motor vehicle having a suspension link,
pivot means pivotally supporting said link for jounce and rebound movement,
a torsion bar,
attachment means securing said bar to said link,
said attachment means comprising an aperture formed in said link,
a spring seat depression formed in said link adjacent said aperture,
said bar having a hook-shaped end,
said hook-shaped end passing through said aperture and having the tip of said end seated in the adjacent spring seat,
said hook-shaped end lying in a plane that intersects the pivot axis of said pivot means at a generally right angle,
said bar being stressed whereby said tip is biased into engagement with said spring seat.

3. A suspension system for a motor vehicle having a frame, a suspension link and pivot means pivotally supporting said link on said frame for jounce and rebound movement,
a torsion bar having a first portion connected to said frame,
said bar having a longitudinally extending portion interposed between said first portion and said link,
attachment means securing said bar to said link,
said attachment means comprising an aperture formed in said link,
a spring seat formed in said link adjacent said aperture,
said bar having a hook-shaped end,
said hook-shaped end lying in a substantially vertical plane that intersects the pivot axis of said pivot means at a generally right angle,
said hook-shaped end passing through said aperture and having the tip of said end seated in said spring seat,
said bar being constructed to resiliently support a portion of the sprung mass of said vehicle on said link,
said bar being further constructed to support said link against longitudinal displacement with respect to said frame,
said bar being stressed whereby the tip of said bar is biased into engagement with said spring seat from full jounce to full rebound movement of said link.

4. A suspension system for a motor vehicle according to claim 3 and including:
said aperture having a width approximately equal to the thickness of said end of said bar, said spring seat comprising a depression having a width approximately equal to the thickness of said tip of said bar.

5. A suspension system for a motor vehicle having a frame, left and right suspension links, and pivot means pivotally supporting said links on said frame for jounce and rebound movement,
- a torsion bar interconnecting said left and right suspension links,
- said torsion bar having a transverse portion connected to said frame,
- said bar having left and right longitudinally extending portions interposed between the left and right ends of said transverse portion and said left and right links,
- attachment means securing said bar to said links,
- said attachment means comprising an aperture formed in each of said links,
- a spring seat depression formed in said links adjacent each of said apertures,
- said bar having a hook-shape at each of its ends,
- each of said hook-shaped ends lying in a plane that is generally perpendicular to a plane extending generally parallel to the axes of said portions,
- each of said hook-shaped ends passing through one of said apertures and having the tip of said end seated in the adjacent spring seat.

6. A suspension system for a motor vehicle according to claim 5 and including:
- said transverse portion of said torsion bar being longitudinally spaced from said suspension links,
- said bar being constructed to resiliently support a portion of the sprung mass of a vehicle body on said links,
- said bar being further constructed to support said links against longitudinal displacement with respect to said frame,
- said aperture and said spring seat depression having a width approximately equal to the thickness of said bar at said end,
- said bar being prestressed whereby said tip of each of said bar ends is biased into engagement with its spring seat from full jounce to full rebound movement of said links,
- each of said hook-shaped ends lying in a substantially vertical plane that is generally perpendicular to the pivot axis of the pivot means adjacent thereto.

7. A suspension system for a motor vehicle having a frame, left and right suspension links, and pivot means pivotally supporting said links on said frame for jounce and rebound movement,
- a plurality of torsion bars each having a transverse portion supported on said frame,
- each of said bars having left and right longitudinally extending portions interposed between its said transverse portion and said links,
- attachment means securing said bars to said links,
- said attachment means comprising a plurality of apertures formed in each of said links,
- a spring seat depression formed in said links adjacent each of said apertures,
- said bars each having a hook-shaped end passing through one of said apertures and having the tip of said bar end seated in a spring seat,
- each of said hook-shaped ends lying in a plane that is generally perpendicular to a plane extending generally parallel to the axes of said portions,
- said transverse portions of said torsion bars being longitudinally spaced from said suspension links,
- said bars being constructed to resiliently support a portion of the sprung mass of a vehicle body on said links,
- said bars being further constructed to support said links against longitudinal displacement with respect to said frame,
- said aperture and said spring seat having a width approximately equal to the thickness of said bar at said end,
- said bars being prestressed whereby the tip of each of said bars is biased into engagement with its spring seat from full jounce to full rebound movement of said links.

* * * * *